United States Patent
Bertram

(10) Patent No.: US 7,571,451 B2
(45) Date of Patent: Aug. 4, 2009

(54) METHOD AND APPARATUS FOR PERFORMING SESSION BASED CONDITIONAL ACCESS

(75) Inventor: Michael C. Bertram, San Jose, CA (US)

(73) Assignee: Cox Communications, Inc., Atlanta, GA (US)

( * ) Notice: Subject to any disclaimer, the term of this patent is extended or adjusted under 35 U.S.C. 154(b) by 1265 days.

(21) Appl. No.: 10/361,266

(22) Filed: Feb. 10, 2003

(65) Prior Publication Data
US 2003/0154474 A1    Aug. 14, 2003

Related U.S. Application Data

(63) Continuation of application No. 09/458,619, filed on Dec. 10, 1999, now abandoned.

(60) Provisional application No. 60/127,127, filed on Mar. 31, 1999.

(51) Int. Cl.
*H04N 7/16* (2006.01)
*H04N 7/173* (2006.01)

(52) U.S. Cl. .................. 725/31; 725/25; 725/86; 725/87

(58) Field of Classification Search ............ 725/25, 725/31, 86–87, 91, 93, 100; 380/200, 211, 380/239, 241
See application file for complete search history.

(56) References Cited

U.S. PATENT DOCUMENTS

| | | | |
|---|---|---|---|
| 4,225,884 A * | 9/1980 | Block et al. | 380/233 |
| 4,771,458 A * | 9/1988 | Citta et al. | 380/239 |
| 4,989,245 A | 1/1991 | Bennett | 380/23 |
| 5,138,649 A * | 8/1992 | Krisbergh et al. | 455/420 |
| 5,479,508 A | 12/1995 | Bestler et al. | 380/20 |
| 5,485,221 A | 1/1996 | Banker et al. | 348/563 |
| 5,592,551 A | 1/1997 | Lett et al. | 380/20 |
| 5,600,364 A | 2/1997 | Hendricks et al. | 348/1 |
| 5,600,573 A | 2/1997 | Hendricks et al. | 364/514 |
| 5,631,693 A | 5/1997 | Wunderlich et al. | 380/212 |
| 5,826,166 A | 10/1998 | Brooks et al. | 455/5.1 |
| 5,894,320 A | 4/1999 | Vancelette | 348/7 |
| 5,930,361 A | 7/1999 | Hayashi et al. | 380/15 |
| 6,005,631 A | 12/1999 | Anderson et al. | 348/460 |
| 6,055,315 A | 4/2000 | Doyle et al. | 380/242 |
| 6,070,001 A | 5/2000 | Meissner et al. | 395/200.33 |
| 6,118,976 A | 9/2000 | Arias et al. | 725/101 |
| 6,157,719 A | 12/2000 | Wasilewski et al. | 380/21 |
| 6,184,878 B1 | 2/2001 | Alonso et al. | 345/327 |
| 6,211,901 B1 | 4/2001 | Imajima et al. | 348/7 |
| 6,240,553 B1 | 5/2001 | Son et al. | 370/468 |
| 6,378,130 B1 * | 4/2002 | Adams | 725/95 |

* cited by examiner

*Primary Examiner*—Hunter B. Lonsberry
(74) *Attorney, Agent, or Firm*—Merchant & Gould

(57) ABSTRACT

A video-on-demand conditional access information distribution system includes establishing a session with a set top terminal by defining an in-band communications channel for transporting content to the set top terminal, and communicating to the set top terminal via the defined in-band communications channel, an authorization message and descrambling message suitable for determining a descrambling key for descrambling a program stream. The set top terminal sends a request for content via an out of band communications channel and a scrambled program stream is provided to the set top terminal via the defined in-band communications channel. The authorization message is sent prior to the set top terminal receiving the descrambling message and the scrambled program stream, which includes video-on-demand content requested by the set top terminal.

14 Claims, 3 Drawing Sheets

US 7,571,451 B2

METHOD AND APPARATUS FOR PERFORMING SESSION BASED CONDITIONAL ACCESS

CROSS REFERENCE TO RELATED APPLICATIONS

This application is a continuation of commonly owned, pending U.S. patent application Ser. No. 09/458,619, filed on Dec. 10, 1999 now abandoned, which application claims benefit of U.S. Provisional Patent Application Ser. No. 60/127,127, filed on Mar. 31, 1999, and both related applications are incorporated herein by reference in their entirety.

BACKGROUND OF THE INVENTION

1. Field of the Invention

The present invention relates to an information distribution system such as a video-on-demand (VOD) system. More particularly, the present invention relates to a method and apparatus for providing session-based conditional access to on-demand content of variable duration within a conditional access information distribution system.

2. Description of the Background Art

In an information distribution system, such as video on demand (VOD) system, an information provider (e.g., a head-end in a cable television system) must control the distribution of requested information to ensure that only an appropriate information consumer (e.g., a requesting VOD subscriber) is able to utilize the distributed information. To provide this functionality, information distribution systems are often implemented using a conditional access system.

VOD systems providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/IEC standards 13818, which is incorporated herein by reference in its entirety. Additionally, a compressed digital video system is described in the Advanced Television Systems Committee (ATSC) digital television standard document A/53, incorporated herein by reference.

MPEG-based conditional access systems typically have three main attributes: the scrambling (or encoding) of MPEG streams, the transmission of de-scrambling messages and the transmission of authorization messages. De-scrambling messages are embedded in the MPEG transport stream and used by information consumer equipment (e.g., set top terminals) to descramble the content. Authorization messages can be sent with the scrambled stream or by some other route and are used to authorize set top terminals to use the descrambling information.

Conditional access systems are typically adapted to a broadcast service model, whereby scrambling is performed on a "per service" basis or a "per event" basis. Per service scrambling supports protection of subscription channels where access is provided on a 24 hour basis over an extended period of time. Per event scrambling supports pay per view services where access is provided for a short, pre-scheduled period of time.

Unfortunately, the broadcast service model does not adequately support the unique needs of video on demand (i.e., non-broadcast) services. Specifically, per service scrambling provides limited protection in on demand situations where multiple users have exclusive access to the same channel separated by time. Per event scrambling does not accommodate the need for protection for unscheduled access periods of variable duration.

Therefore, it is seen to be desirable to provide a method and apparatus enabling session-based conditional access to on-demand content of variable duration.

SUMMARY OF THE INVENTION

The disadvantages heretofore associated with the prior art are overcome by the present invention of a method and apparatus for enabling session-based conditional access to on-demand content of variable duration.

Specifically, a video-on-demand conditional access information distribution system includes establishing a session with a set top terminal by defining an in-band communications channel for transporting content to the set top terminal, and communicating to the set top terminal via the defined in-band communications channel, an authorization message and descrambling message suitable for determining a descrambling key for descrambling a program stream. The set top terminal sends a request for content via an out of band communications channel and a scrambled program stream is provided to the set top terminal via the defined in-band communications channel. The authorization message is sent prior to the set top terminal receiving the descrambling message and the scrambled program stream, which includes video-on-demand content requested by the set top terminal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Throughout this description various terms are used to describe the invention. Unless modified by the following description, several of the terms are defined as follows: Scrambling comprises a method of protecting a data stream by transforming the value of bits in the stream based on a given key. For the purposes of this disclosure scrambling has the same meaning as encrypting. Descrambling comprises a method for transforming data stream bits back to their original value based on the use of a key. For the purposes of this description disclosure descrambling has the same meaning as decryption. A conditional access (CA) system is a system that generates keys, descrambling messages, and authorization messages supporting the scrambling and descrambling of, e.g., MPEG encoded programs. A descrambling message comprises a conditional access message containing descrambling information for a particular MPEG program. The descrambling information may contain the descrambling key or the information a Set Top Box (or boxes) needs to generate the descrambling key. An authorization message comprises a conditional access message authorizing a particular Set Top Box to use a descrambling key to descramble a particular MPEG program.

Figure 1:
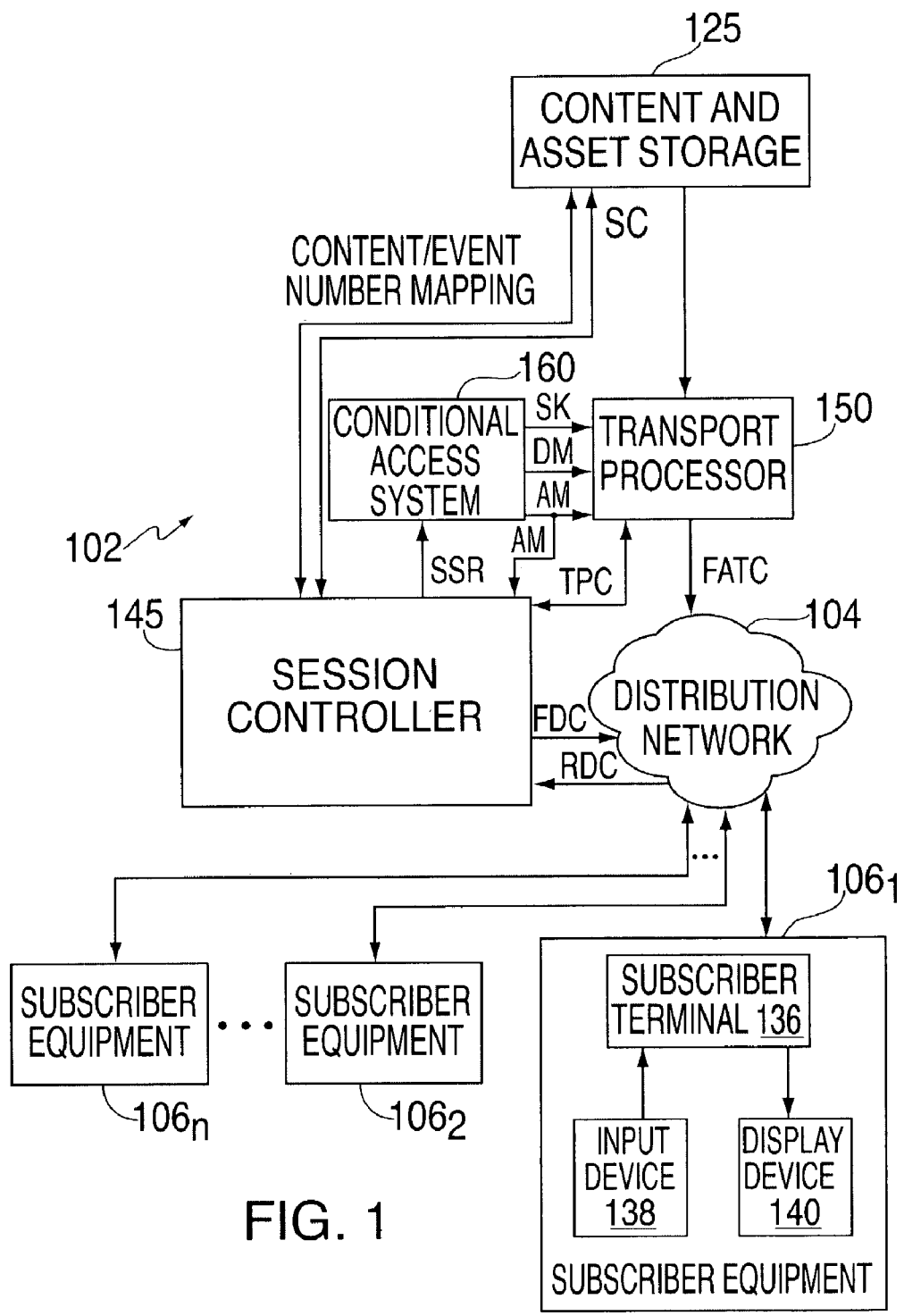
FIG. 1 depicts a high level block diagram of an interactive information distribution system.

FIG. 1 depicts a high level block diagram of an interactive information distribution system. Specifically, FIG. 1 depicts a high level block diagram of an interactive information distribution system 100 containing the present invention. The system 100 contains service provider equipment 102, a communications network 104 and subscriber equipment $106_n$, where n is an integer greater than zero.

The service provider equipment 102 comprises a content and asset storage module 125, a session controller 145, a transport processor 150 and a conditional access system 160. Briefly, the session controller 145, in response to a request from subscriber equipment 106, causes requested content and associated assets to be retrieved from the content and asset storage module 125 and to be provided to the transport processor 150. The transport processor 150 combines or multiplexes the content and asset data to provide an output data stream for the requesting subscriber. The output data stream is conditioned for transport to the requesting subscriber via a forward application transport channel (FATC) within the distribution network 104. The conditional access system 160, in response to a service scrambling request (SSR) signal produced by the session controller 145, generates scrambling keys SK, descrambling messages DM and authorization messages AM. The scrambling keys are utilized by the transport processor 150 to scramble the content and/or assets provided to the requesting subscriber via the output data stream. The descrambling messages DM and authorization messages AM are provided to the requesting subscriber via the forward application transport channel. The authorization may also be provided to the subscriber via the forward data channel (FDC). The requesting subscriber equipment receives and decodes the requested content and/or assets using, as necessary, the descrambling messages DM and authorization messages AM provided via the FATC and/or FDC.

The content and asset storage module 125 is used to store content such as movies, television programs and other information offerings of the interactive information distribution system 100 of FIG. 1. Additionally, the content and asset storage module 125 is used to store assets such as bit map imagery, graphic overlay, control scripts and the like. The assets may comprise, for example, navigation assets that are used by a set top terminal to interactively navigate, and select for viewing, the offerings or content available from the service provider equipment 102. The content and asset storage module 125, in response to a storage control signal SC produced by the session controller 145, provides content and/or asset data to the transport processor 150.

The session controller 145 (or session manager) provides session control of the information flowing to and from the content and asset storage module 125, and may be generally described as a system providing or controlling communications between, for example, a cable system head-end and one or more set top terminals. The session controller 145 produces the storage control signal SC for controlling and communicating with the content and asset storage module 125, and a transport processor control signal TPC for controlling and communicating with the transport processor 150. In response to a user request for particular content, the session controller 145 causes the requested content file and any associated assets to be streamed from the content and asset storage module 125 to the transport processor 150.

The conditional access system 160, in response to a service scrambling request (SSR) signal produced by the session controller 145, generates scrambling keys SK, descrambling messages DM and authorization messages AM. Based on the service scrambling request, the scrambling keys SK and descrambling messages DM are provided to the transport processor 150. Additionally, the authorization messages AM are provided to the transport processor 150 if the FATC is used to provide authorization messages to the set top terminals. Optionally, the authorization messages AM are provided to the session controller 145 for subsequent coupling to the appropriate set top terminal via the forward data channel FDC.

The session controller 145 sends data, such as commands, to set top terminals via a forward data channel (FDC). The session controller 145 receives data, such as information stream requests and session initiation data (set top identification, capability and the like) via a reverse data channel (RDC). The FDC and RDC are supported by the distribution network 104 and comprise relatively low bandwidth data channels, such as one-two megabits per second data channels utilizing QPSK, QAM, or other modulation techniques. The FDC and RDC are also known as "out-of-band" channels, while the relatively high bandwidth forward application transport channel (FATC) is also known as an "in-band" channel. The session controller 145 contains an interface device for sending control information via the forward data channel FDC and receiving control information and request information via the reverse data channel RDC using the so-called "out-of-band" carrier frequencies.

The transport processor 150 accomplishes all of the forward content channel transmission interface requirements of the system 100 of FIG. 1. Specifically, the transport processor 150 is coupled to subscriber equipment via the forward applications transport channel (FATC). The FATC is supported by the distribution network 104 and comprises a relatively high bandwidth communications channel well suited to carrying video, audio and data such as, for example, multiplexed MPEG-2 transport packets. It should be noted that data normally conveyed to a set top terminal via the FDC may be included in the FATC data stream.

The transport processor 150 is capable of scrambling content and of inserting descrambling messages and authorization messages into a transport stream being provided to an output channel. The transport processor 150 utilizes descrambling keys SK provided by the conditional access system 160 to scramble specific content, or content on a specific channel. The transport processor 150 embeds the descrambling messages DM and authorization messages AM provided by the conditional access system 160 within the scrambled content or channel (that is, in-band communications to a requesting STT). Optionally, the authorization messages AM are provided to the appropriate STT via the forward data channel FDC (that is, via the out-of-band communication to the STT). The transport processor 150 contains a digital video modulator for modulating the content and/or asset streams provided by the content and asset storage module 125 on to one or more carrier frequencies that are compatible with the transmission requirements of the network 104. That is, the transport processor 150 is capable of providing a plurality of scrambled or unscrambled content and/or asset streams modulated onto various carrier frequencies suitable for use in the distribution network 104. It should be noted that in the exemplary embodiment the descrambling messages DM are never sent by the forward data channel FDC, since the descrambling messages and the content to be descrambled using the descrambling messages are related to each other by a fairly close timing relationship, such that the set top terminal receiving descrambling messages DM out of sync with content to be descrambled will likely be unable to perform the descrambling operation.

The transport processor 150 also contains a modulator for modulating the combined content and asset stream onto one or more carrier frequencies for transmission on the FATC, the so-called "in-band" carrier frequencies.

The session controller 145 scrambles the retrieved content provided by the content and asset storage module 125 and inserts descrambling messages and authorization messages into a transport stream including the scrambled content. That is, the session controller 145 scrambles the content on the channel intended to be used by a set top terminal requesting the scrambled content. In addition, the session controller 145 inserts descrambling messages and authorization messages into the transport stream provided by that channel to the requesting set top terminal such that the set top terminal may access the scrambled content in the manner previously described.

In a scrambling mode of operation, the session controller 145 provides a service scrambler request (SSR) signal to the conditional access system 160 including the channel number or identifier of the channel to be scrambled (this channel identifier is also provided to the STT requesting the scrambled content stream). The service scrambler request SSR signal also includes information indicative of the service of the content to be scrambled, precisely which content is to be scrambled, and which channel is to transport the scrambled content to the requesting STT.

The distribution network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

The subscriber equipment 106 comprises a set top terminal or a set top box 136, a display device 140 (e.g. a conventional television) and a user input device 138 (e.g. a remote control device). Each set top terminal 136 receives the data streams from the FATC, demodulates the received data streams and, in the case of video streams, processes the demodulated video streams for subsequent display on the display device 140. In the case of receiving scrambled data streams, the STT descrambles the received data streams using the descrambling messages DM provided to the STT via the FATC. The STT uses the authorization messages AM provided via the FATC or FDC to determine if a descrambling of the received scrambled stream is authorized. In addition, the set top terminal 136 accepts commands from the remote control input device 138 or other input device. These commands are formatted, modulated, and transmitted through the distribution network 104 to the session controller 145. Typically, this transmission is accomplished through the reverse data channel RDC. These commands are preferably transmitted through the same network used to transmit information to the set top terminal. However, the RDC coupling the set top terminal to the provider equipment 102 may be a separate network, e.g. a FATC through a television cable network and an RDC through a telephone network. The telephone network could also support the FDC.

Figure 2:
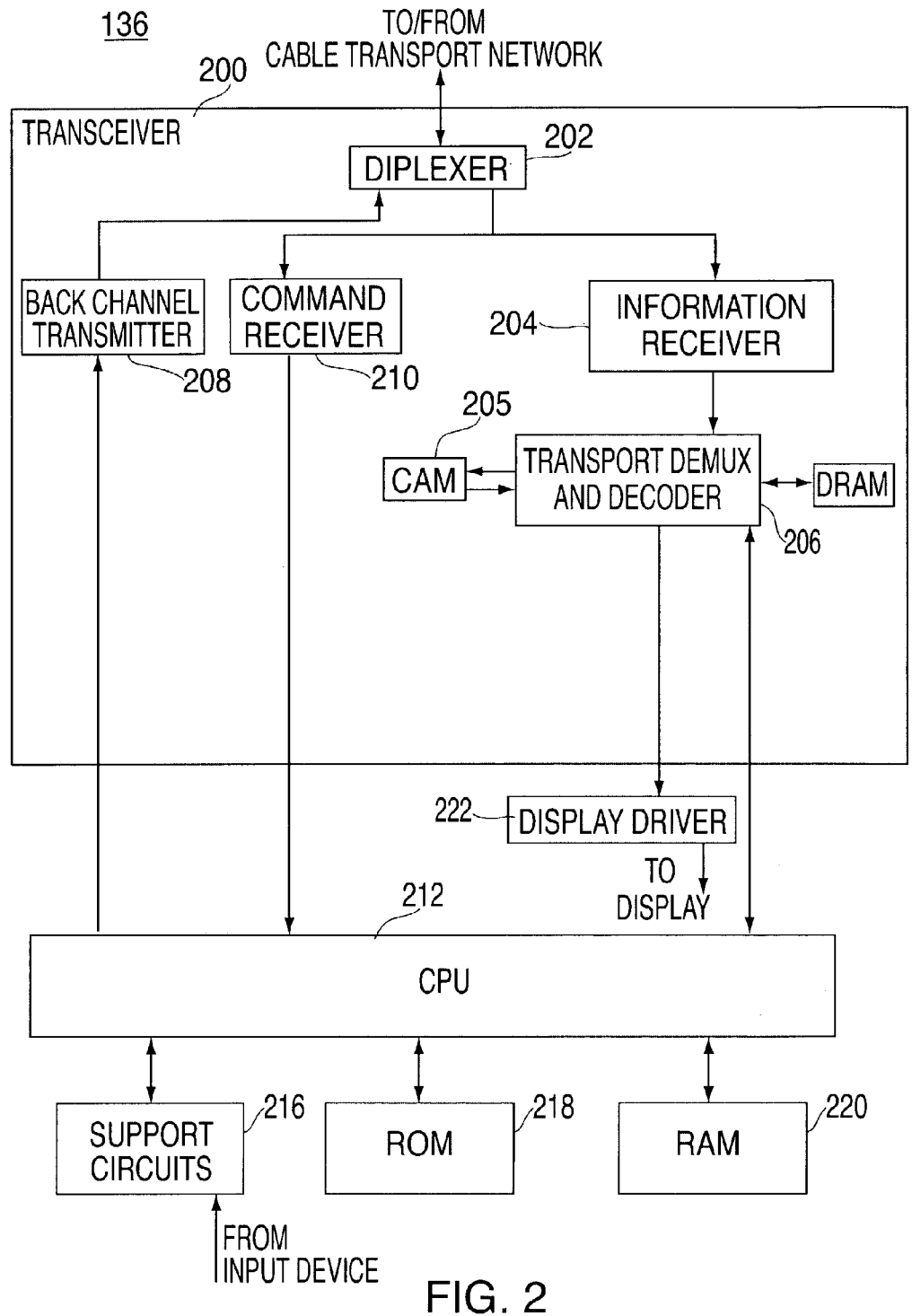
FIG. 2 depicts a block diagram of the set top terminal suitable for use in the interactive information distribution system of FIG. 1.

FIG. 2 depicts a high level block diagram of a set top terminal (STT) suitable for use in the interactive information distribution system of FIG. 1. A set top terminal (or set top box) comprises a device capable of receiving and decompressing content within, e.g., an MPEG transport stream to produce a resulting signal(s) suitable for use by a presentation device such as a display device. Set top terminals are also capable of conditional access message processing and transport stream descrambling.

Specifically, FIG. 2 depicts a block diagram of an exemplary embodiment of the set top terminal 136 interactive information distribution system of FIG. 1. The STT 136 of FIG. 2 comprises a transceiver 200, a central processing unit (CPU) 212 and a display driver 222. The CPU 212 is supported by random access memory (RAM) 220, read only memory (ROM) 218 and various support circuits 216 such as clocks, power supply, an infrared receiver and the like. The transceiver 200 contains a diplexer 202, a back channel transmitter 208, an information channel receiver 204, a conditional access module 205, a command channel receiver 210 and an transport demultiplexer and decoder 206. The diplexer 202 couples the three channels carried by a single cable within the network to the transmitter and receivers.

Each receiver 204 and 210 contains a tuner, amplifiers, filters, a demodulator, and a depacketizer. As such, the receivers tune, downconvert, and depacketize the signals from the cable network in a conventional manner. The information channel receiver 204 contains a conventional QAM demodulator such as a model BCM3115 manufactured by the Broadcom Corporation. Other such demodulators are well-known in the communications arts and could be used in this application. However, this particular QAM demodulator also contains a built in "out-of-band" QPSK demodulator for handling command channel data carried by the forward command channel. As such, a single integrated circuit demodulates both subscriber requested information (audio and video) as well as command data.

The transport demultiplexer and decoder 206 processes the data packets carrying subscriber requested information produced by the QAM demodulator into useable signals for the end user display, e.g., television, home studio, video recorder and the like. The decoder is coupled to a dynamic random access memory (DRAM) to facilitate decoding of the data packets and processing of applets, as shall be discussed below. The signals for display are conventionally processed by a display driver 222 to produce a video signal suitable for use by, e.g., the display device 140.

The transport demultiplexer and decoder 206 also extracts authorization and descrambling messages from the received data stream and provides the extracted authorization and descrambling messages to the conditional access module 205.

The conditional access module 205, illustratively a smart card or dedicated chip set, accepts authorization and descrambling messages extracted by the transport demultiplexer and decoder 206 and responsively provides descrambling keys for the selected content stream when appropriately authorized.

The transport demultiplexer and decoder 206 utilizes the descrambling keys provided by the conditional access module 205 to descramble or decrypt the selected content stream prior to decoding the stream to form appropriate presentation signals.

The demodulated QPSK signal provides command and control information to the CPU 212 for generating a graphical user interface upon the display device 140. The CPU 212, operating in combination with the decoder 206 as well as a video signal from the information channel, produces screen displayed buttons, icons and graphical regions with which a subscriber interacts using, for example, a remote control device. User interaction comprises, for example, the navigation of a graphical user interface to select one of a plurality of available program titles for immediate or future presentation.

Session control commands are implemented by the session controller 145 and not the set top terminal 136 alone. Each command is implemented by the execution of an applet by the set top terminal 136. The applet is transmitted to the STT by the session manager in response to, e.g., back channel requests transmitted by the STT. The applets control both information sessions, e.g., the presentation of video to the television screen, and navigator functions, e.g., the menus that facilitate selection of a video program. As such, particular commands include, but are not limited to, information or menu navigation commands, movie start at beginning, movie start at the middle, play, stop, rewind, forward, pause, and the like. These presentation and navigation control commands are sent via a back channel transmitter 208 using binary phase shift key (BPSK) modulation.

Figure 3:
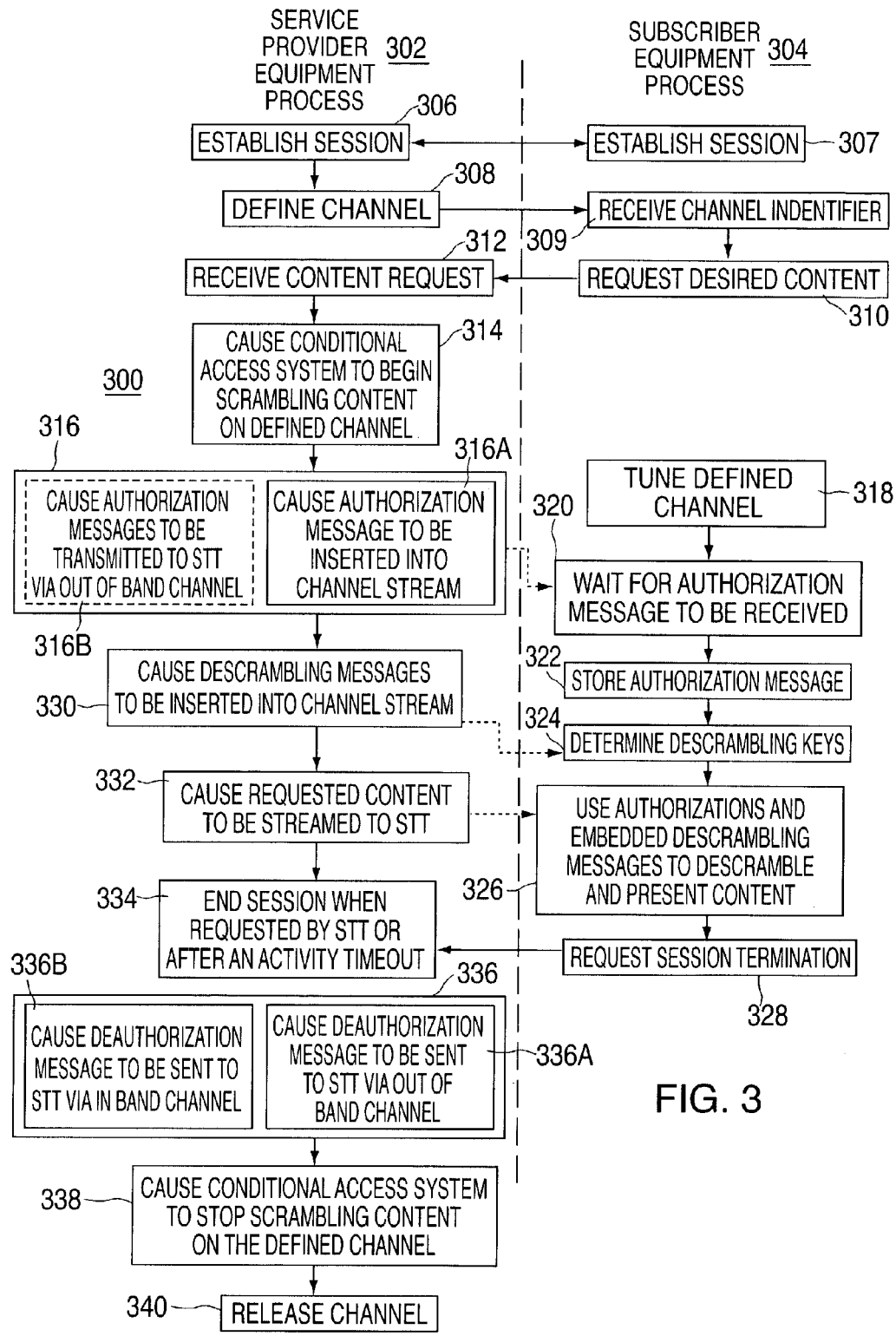
FIG. 3 depicts a flow diagram of an illustrative implementation of an session-based conditional access method as performed on both service provider equipment and subscriber equipment within the interactive information distribution system of FIG. 1.

FIG. 3 depicts a flow diagram of an illustrative implementation of a session-based conditional access method as performed on both service provider equipment and subscriber equipment within the interactive information distribution system of FIG. 1. Specifically, FIG. 3 is divided into two columns, namely: a service provider equipment process column 302 and a subscriber equipment process column 304.

The method 300 of FIG. 3 begins at steps 306 and 307 where, respectively, the service provider equipment 102 and subscriber equipment 106 establish a session with each other.

At step 308, the service provider equipment 102 identifies or defines a channel identifier (e.g., a physical and logical transmission channel) and communicates the defined channel identifier to the subscriber equipment. The subscriber equipment receives the defined channel identifier at step 309.

At step 310, the subscriber equipment requests desired content from the service provider equipment. At step 312 the service provider equipment receives the content request from the subscriber equipment.

At step 314, the provider equipment causes the conditional access system to begin scrambling content on the defined channel. That is, the session controller 145 issues a service scrambling request (SSR) to the conditional access system 160. The conditional access system 160, in response to the SSR, generates scrambling keys SK, descrambling messages DM and authorization messages AM which are provided to the session controller 145 and to the transport processor 150. The transport processor 150 utilizes the scrambling keys SK provided by the conditional access system 160 to scramble specific content on the defined channel or all content on the defined channel.

At step 316, the provider equipment 102 causes the authorization messages to be inserted into the FATC stream (i.e., the in-band channel) 316A or transmitted to the STT via FDC (i.e., the out-of-band channel) 316B. That is, transport processor 150 embeds the authorization messages AM provided by the conditional access system 160 within the scrambled content provided via the forward applications transport channel FATC (i.e., in-band communication to the STT) 116A. Optionally, the authorization messages AM are provided to the appropriate STT via the forward data channel FDC (i.e., out-of-band communication to the STT).

At step 330, the provider equipment causes the descrambling messages DM to be inserted into the FATC stream (i.e., the in-band channel).

At step 332, the provider equipment begins streaming the requested content to the STT via the defined channel. That is, the requested content is streamed to the requesting STT via the defined channel. Since information provided by the defined channel is now being scrambled by the transport processor 150, the requested content is scrambled prior to being coupled to the STT. Additionally, the descrambling messages and, optionally, authorization messages are embedded in the scrambled stream provided to the STT.

At step 318, the subscriber equipment tunes the defined channel, illustratively, a QAM channel comprising a transport streams including video and audio streams associated with the requested content. It should be noted that the requested content is not yet available to the subscriber at this time. Specifically, the requested content has not yet been streamed to the subscriber via the defined channel (see step 332) and the subscriber has not received (per step 320) or used (per step 328) the authorization and descrambling messages necessary to decrypt and present the requested (scrambled) content.

At step 320, the subscriber equipment waits for an authorization message to be received. That is, a requesting set top terminal 136, having tuned to the channel indicated during session setup, monitors the incoming data on the in-band channel (FATC) or the out-of-band channel (FDC) until an authorization message provided by the conditional access system 160 is received.

At step 322, upon receiving the authorization message associated with the defined channel (per step 320), the authorization message is stored within the subscriber equipment conditional access module 205. The received authorization message for the requested content will be subsequently used by the set top terminal to derive the descrambling key from the descrambling messages embedded in the defined channel used to provide the requested content to the subscriber.

At step 324, the stored authorization is used to determine the descrambling keys. That is, if the conditional access module 205 has received the appropriate authorization messages for the channel containing the requested content, the conditional access module will derive the necessary keys from the embedded descrambling messages.

At step 326, the descrambling keys are used to descramble the requested content. That is, the subscriber equipment utilizes the descrambling keys derived from the descrambling messages to descramble the content and present the descrambled content on, e.g., a display device. This occurs when the subscriber equipment begins receiving the scrambled requested content (step 332).

At step 328, upon concluding the presentation of the desired content, the subscriber equipment requests that the session be terminated.

At step 334, the service provider equipment stops streaming the requested content when either a session termination request is received or when the STT has been inactive for a predetermined period of time.

At step 336, the service provider equipment causes a de-authorization message to be sent to the STT via the FDC (i.e., the out-of-band channel) 336A or via the FATC (i.e., the in-band channel) 336B. That is, transport processor 150 embeds the de-authorization messages DM provided by the conditional access system 160 within the scrambled content provided via the forward applications transport channel FATC or within the forward data channel FDC. By including the de-authorization messages DM in either the in-band (step 336B) or out-of-band (step 336A) channels, the descrambling keys derived from the previous authorization messages will be inactivated. The method 300 then proceeds to step 338.

At step 338, the provider equipment causes the conditional access system to stop scrambling content on the defined channel. The method 300 then proceeds to step 340, where the service provider equipment releases the defined channel such that the channel may be utilized by another session between the service provider equipment and another subscriber.

It should be noted that while the steps comprising the above-described method 300 of FIG. 3 are depicted as being in a particular order, variations of that order are contemplated by the inventor and are within the scope of the invention. For example, the STT can request content at the establishment of a session or upon receiving the service or authorization from the provider equipment (step 320). In either case, it is desirable for the STT to receive the service or authorization from the provider equipment 102 prior to receiving scrambled content. In this manner the STT is able to descramble all of the requested content.

To ensure that the STT receives the service or authorization from the provider equipment prior to receiving scrambled content, the requested content may be transmitted without scrambling until the service or authorization is transmitted or transmission of the scrambled requested content may be delayed until the service or authorization is transmitted. The first case provides low-latency content delivery, while the second case provides complete protection of all content.

Additional requests for content are satisfied by the session controller 145 by transmitting the additional requested content within the same scrambled service being provided to the STT via the defined channel.

The above-described invention extends current conditional access capabilities to provide on-demand security for session-based content access. Advantageously, the invention avoids pre-scheduling and fixed duration restrictions associated with an service-based conditional access approach by adapting the a service- or channel-based conditional access capability. In this manner, inadequacies of shared service access are avoided while conditional access capabilities providing low latency on-demand authorization capabilities are enabled.

Although various embodiments which incorporate the teachings of the present invention have been shown and described in detail herein, those skilled in the art can readily devise many other varied embodiments that still incorporate these teachings.

What is claimed is:

1. In a video-on-demand conditional access information distribution system comprising provider equipment for providing video-on-demand programs to subscribers via an in-band communications channel, a method comprising the steps of:
    establishing a session with a set top terminal including defining the in-band communications channel for transporting content to said set top terminal;
    communicating to said set top terminal, via said defined in-band communications channel, an authorization message and a descrambling message suitable for determining a descrambling key for descrambling a program stream;
    scrambling said program stream provided to a set top terminal via said defined in-band communications channel to produce a scrambled program stream;
    including, within said program stream being scrambled, video-on-demand content requested by said set top terminal;
    sending, prior to said set top terminal receiving said descrambling message and said requested content, said authorization message;
    storing said authorization message at said set top terminal; and
    deriving a descrambling key from said stored authorization message and the descrambling messages.

2. The method of claim 1, wherein said defined in-band channel comprises a quadrature amplitude modulated (QAM) channel and said program stream comprises an MPEG transports stream.

3. The method of claim 1, further comprising the steps of:
    communicating to said set top terminal, via one of said defined in-band communications channel and an out-of-band communications channel, a de-authorization message, said de-authorization message being communicated in response to a session terminating event.

4. The method of claim 3, wherein said session terminating event comprises one of a session termination request being received from said subscriber and a period of subscriber inactivity exceeding a predetermined time interval.

5. The method of claim 1, wherein said authorization message and descrambling message are communicated to a subscriber after said content is included in said scrambled program stream, said method further comprising the step of:
    repeating, for a predetermined period of time, said step of communicating said authorization message and descrambling message to said subscriber.

6. The method of claim 1, wherein said conditional access information distribution system comprises an information on demand system.

7. In a video-on-demand conditional access information distribution system comprising provider equipment for providing video-on-demand programs to subscribers via an in-band communications channel, provider apparatus comprising:
    a conditional access system, for scrambling a program stream to produce a scrambled program stream;
    a session manager, for establishing a session with a set top terminal including defining an in-band communications channel for transporting said scrambled program stream to said set top terminal, said session manager including within said scrambled program stream content requested by said set top terminal;
    said session manager communicating to said set top terminal, via said defined in-band communications channel, an authorization message and a descrambling message suitable for determining a descrambling key for descrambling said program stream; and
    said conditional access system providing said authorization message and said descrambling message to said session manager, wherein said authorization message is sent prior to said set top terminal receiving said descrambling message and said scrambled program stream, said authorization message is stored at said set top terminal and a descrambling key is derived from said stored authorization message and the descrambling messages.

8. The provider apparatus of claim 7, further comprising an information server, for providing said requested content to said session manager.

9. The provider apparatus of claim 7, wherein said defined in-band channel comprises a quadrature amplitude modulated (QAM) channel and said program stream comprises an MPEG transports stream.

10. The provider apparatus of claim 7, wherein:
    said session manager, in response to a session terminating event, communicates a de-authorization message to said set top terminal via one of said defined communications channel and an out-of-band communications channel.

11. The provider apparatus of claim 10, wherein said session terminating event comprises one of a session termination request being received from a subscriber and a period of subscriber inactivity exceeding a predetermined time interval.

12. The provider apparatus of claim 7, further comprising:
a data storage module, coupled to the information server, for storing content.

13. A method for providing session-based conditional access to video-on-demand content, comprising the steps of:
establishing a session with a set top terminal including defining an in-band communications channel for transporting content to said set top terminal
scrambling a program stream provided to said set top terminal via said defined in-band communications channel to produce a scrambled program stream; including, within said program stream being scrambled, video-on-demand content requested by said set top terminal; and
communicating to said set top terminal, via said defined in-band communications channel, an authorization message and a descrambling message suitable for determining a descrambling key for descrambling said program stream, wherein said authorization message is sent prior to said set top terminal receiving said descrambling message and said requested content, said authorization message is stored at said set top terminal and a descrambling key is derived from said stored authorization message and the descrambling messages.

14. The method of claim 13, further comprising the step of:
communicating to said set top terminal, via said defined communications channel and an out-of-band communications channel, a de-authorization message, said de-authorization message being communicated in response to a session terminating event.

* * * * *